(12) United States Patent
Thimirachandra

(10) Patent No.: US 12,731,266 B2
(45) Date of Patent: Sep. 8, 2026

(54) METHOD AND COMPUTING DEVICE FOR ENHANCED DEPTH SENSOR COVERAGE

(71) Applicant: ZEBRA TECHNOLOGIES CORPORATION, Lincolnshire, IL (US)

(72) Inventor: Sanjeewa Thimirachandra, Kotugoda (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 412 days.

(21) Appl. No.: 18/106,613

(22) Filed: Feb. 7, 2023

(65) Prior Publication Data

US 2024/0265548 A1 Aug. 8, 2024

(51) Int. Cl.
*G06T 7/13* (2017.01)
*G06T 7/73* (2017.01)

(52) U.S. Cl.
CPC .................. *G06T 7/13* (2017.01); *G06T 7/75* (2017.01); *G06T 2207/10028* (2013.01)

(58) Field of Classification Search
CPC .... G06T 7/13; G06T 7/75; G06T 2207/10028
See application file for complete search history.

(56) References Cited

U.S. PATENT DOCUMENTS

| | | | | |
|---|---|---|---|---|
| 11,669,988 | B1 * | 6/2023 | Miller | G06T 7/593 382/154 |
| 2014/0035906 | A1 * | 2/2014 | Ranjan | G06T 17/05 345/419 |
| 2018/0144500 | A1 * | 5/2018 | Lam | G06T 7/13 |
| 2019/0311546 | A1 * | 10/2019 | Tay | G06T 17/00 |
| 2020/0043186 | A1 * | 2/2020 | Selviah | G06T 7/33 |
| 2021/0312710 | A1 * | 10/2021 | Fathi | G06F 30/13 |
| 2022/0020170 | A1 * | 1/2022 | Gorodetsky | G01S 17/894 |
| 2022/0044441 | A1 * | 2/2022 | Kalra | G06V 10/82 |

OTHER PUBLICATIONS

International Search Report and Written Opinion for International Application No. PCT/US2024/12607 mailed on Apr. 18, 2024.

* cited by examiner

*Primary Examiner* — Xiao Liu
*Assistant Examiner* — Vaisali Rao Koppolu

(57) ABSTRACT

A method in a computing device includes: obtaining (i) a point cloud having captured points depicting a plurality of surfaces of a target object, and (ii) an image depicting the plurality of surfaces of the target object; determining, from the point cloud, respective planes corresponding to each of the plurality of surfaces; determining, from the image, respective boundaries of each of the plurality of surfaces; for each of the plurality of surfaces, generating synthetic points, at least some of the synthetic points having positions different from positions of the captured points in the point cloud, the positions of the synthetic points disposed on a corresponding plane of the target object and within a corresponding surface boundary; and providing an enhanced point cloud including (i) at least a portion of the captured points, and (ii) the synthetic points.

20 Claims, 10 Drawing Sheets

METHOD AND COMPUTING DEVICE FOR ENHANCED DEPTH SENSOR COVERAGE

BACKGROUND

A depth sensor, such as a time-of-flight sensor, can be implemented in conjunction with any of a variety of computing devices to capture a point cloud depicting an object (e.g., a parcel). The captured point cloud can then be processed to determine dimensions of the object, e.g., for use in transport and logistics applications (e.g., optimizing container loading, delivery pricing, or the like). Under certain conditions, however, the point cloud may contain discontinuities or other artifacts that impede the determination of object dimensions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
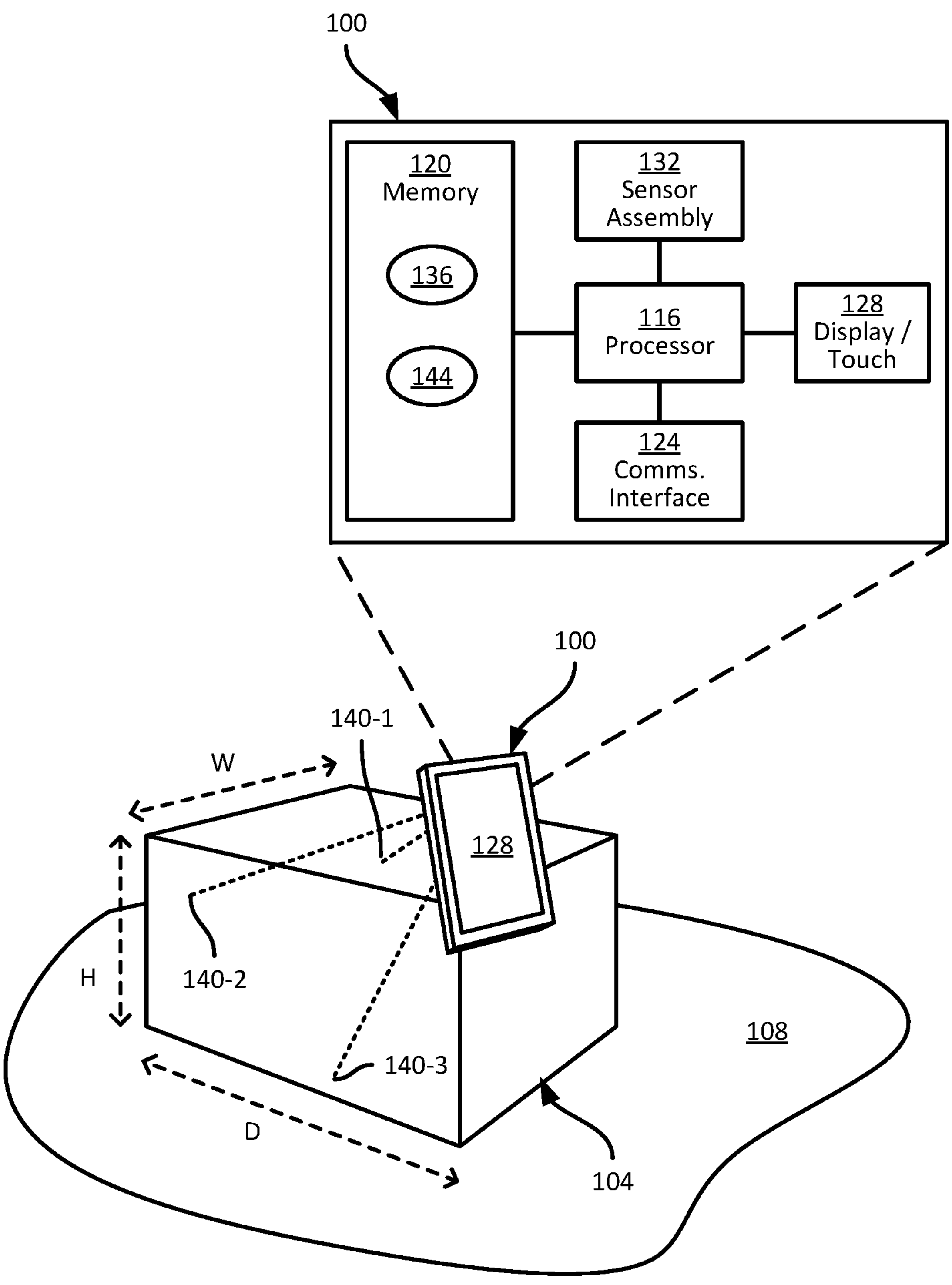
FIG. 1 is a diagram of a computing device for dimensioning an object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a computing device, the method comprising: obtaining (i) a point cloud having captured points depicting a plurality of surfaces of a target object, and (ii) an image depicting the plurality of surfaces of the target object; determining, from the point cloud, respective planes corresponding to each of the plurality of surfaces; determining, from the image, respective boundaries of each of the plurality of surfaces; for each of the plurality of surfaces, generating synthetic points, at least some of the synthetic points having positions different from positions of the captured points in the point cloud, the positions of the synthetic points disposed on a corresponding plane of the target object and within a corresponding surface boundary; and providing an enhanced point cloud including (i) at least a portion of the captured points, and (ii) the synthetic points.

Additional examples disclosed herein are directed to a computing device comprising: a processor configured to: obtain (i) a point cloud having captured points depicting a plurality of surfaces of a target object, and (ii) an image depicting the plurality of surfaces of the target object; and determine, from the point cloud, respective planes corresponding to each of the plurality of surfaces; determine, from the image, respective boundaries of each of the plurality of surfaces; for each of the plurality of surfaces, generate synthetic points, at least some of the synthetic points having positions different from positions of the captured points in the point cloud, the positions of the synthetic points disposed on a corresponding plane of the target object and within a corresponding surface boundary; and provide an enhanced point cloud including (i) at least a portion of the captured points, and (ii) the synthetic points.

FIG. 1 illustrates a computing device 100 configured to capture sensor data depicting a target object 104 within a field of view (FOV) of a sensor of the device 100. The computing device 100, in the illustrated example, is a mobile computing device such as a tablet computer, smartphone, or the like. The computing device 100 can be manipulated by an operator thereof to place the target object 104 within the FOV of the sensor, in order to capture sensor data for subsequent processing as described below. In other examples, the computing device 100 can be implemented as a fixed computing device, e.g., mounted adjacent to an area in which target objects are placed and/or transported (e.g., a staging area, a conveyor belt, a storage container, or the like).

The target object 104, in this example, is a parcel (e.g., a cardboard box or the like), although a wide variety of other target objects can also be processed as set out below. The sensor data captured by the computing device 100 includes a point cloud (e.g., a plurality of depth measurements defining three-dimensional positions of corresponding points on the target object 104) and an image depicting the target object (e.g., a two-dimensional array of pixels each containing color and/or brightness values). From the captured sensor data, the device 100 (or in some examples, another computing device configured to obtain the sensor data from the device 100) is configured to determine dimensions of the target object 104, such as a width "W", a depth "D", and a height "H" of the target object 104.

The target object 104 is, in the examples discussed below, a substantially rectangular prism. As shown in FIG. 1, the height H of the object 104 is a dimension substantially perpendicular to a support surface (e.g., a floor) 108 on which the object 104 rests. The width W and depth D of the object 104, in this example, are substantially orthogonal to one another and to the height H. Various other object shapes may also be dimensioned via the process set out below, as will be apparent to those skilled in the art. The dimensions determined from the captured data can be employed in a wide variety of downstream processes, such as optimizing loading arrangements for storage containers, pricing for transportation services, and the like.

Certain internal components of the device 100 are also shown in FIG. 1. For example, the device 100 includes a processor 116 (e.g., a central processing unit (CPU), graphics processing unit (GPU), or combination thereof) interconnected with a non-transitory computer readable storage medium, such as a memory 120. The memory 120 includes a combination of volatile memory (e.g. Random Access Memory or RAM) and non-volatile memory (e.g. read only memory or ROM, Electrically Erasable Programmable Read Only Memory or EEPROM, flash memory). The memory 120 can store computer-readable instructions, execution of which by the processor 116 configures the processor 116 to perform various functions in conjunction with certain other components of the device 100. The device 100 can also include a communications interface 124 enabling the device 100 to exchange data with other computing devices, e.g. via various networks, short-range communications links, and the like.

The device 100 can also include one or more input and output devices, such as a display 128, e.g., with an integrated touch screen. In other examples, the input/output devices can include any suitable combination of microphones, speakers, keypads, or the like.

Further, the device 100 includes a sensor assembly 132 (also referred to herein as a sensor 132), controllable by the processor 116 to capture point cloud and image data. The sensor assembly 132 can include a sensor capable of capturing both depth and image data, such as a time-of-flight (ToF) sensor. The sensor 132 can be mounted on a housing of the device 100, for example on a back of the housing (opposite the display 128, as shown in FIG. 1) and having an optical axis that is substantially perpendicular to the display 128.

ToF sensors can include, for example, a laser emitter configured to illuminate a scene and an image sensor configured to capture reflected light from such illumination, and determine depth for each captured reflection according to the time difference between illumination pulses and reflections. The sensor can also be configured to capture ambient light. For example, certain ToF sensors employ infrared laser emitters alongside infrared-sensitive image sensors. Such ToF sensors are therefore capable of both generating point cloud data based on reflected light emitted by the laser emitter, and image data corresponding to both reflected light from the emitter and reflected ambient light. The capture of ambient light can enable the ToF sensor to produce an image with a greater resolution than the point cloud.

In other examples, the sensor assembly 132 can include various other sensing hardware, such as a ToF sensor and an independent color camera. In further examples, the sensor assembly 132 can include a depth sensor other than a ToF sensor, such as a stereo camera, or the like.

The memory 120 stores computer readable instructions for execution by the processor 116. In particular, the memory 120 stores a dimensioning application 136 which, when executed by the processor 116, configures the processor 116 to process point cloud data captured via the sensor assembly 132 to detect the object 104 and determine dimensions (e.g., the width, depth, and height shown in FIG. 1) of the object 104.

Under some conditions, the point cloud captured by the sensor assembly 132 can artifacts that impede the determination of accurate dimensions of the object 104. For example, dark-colored surfaces on the object 104 may absorb light emitted by a ToF sensor and therefore reduce the quantity of reflections detected by the sensor 132. In other examples, surfaces of the object 104 that are not perpendicular to an optical axis of the sensor 132 may result in fewer reflections being detected by the sensor. This effect may be more pronounced the more angled a surface is relative to the optical axis (e.g., the further the surface is from being perpendicular to the optical axis). For example, a point 140-1 on an upper surface of the object 104 may be closer to perpendicular to the optical axis and therefore more likely to generate reflections detectable by the sensor 132, while a point 140-2 may lie on a surface at a less perpendicular angle relative to the optical axis of the sensor 132. The point 140-2 may therefore be less likely to be captured in point cloud data.

Still further, increased distance between the sensor 132 and portions of the object 104 may result in the collection of fewer reflections by the sensor 132. The point 140-2 may therefore also be susceptible to underrepresentation in a captured point cloud due to increased distance from the sensor 132, e.g., if the object is sufficiently large (e.g., with a depth D greater than about 1.5 m in some examples). Other points, such as a point 140-3, may also be vulnerable to multipath artifacts, in which light emitted from the sensor 132 impacts the point 140-3 and reflects onto the support surface 108 before returning to the sensor 132, therefore inflating the perceived distance from the sensor 132 to the point 140-3.

In other words, factors such as the angle of a given surface relative to the sensor 132, the distance from the sensor 132 to the surface, and the color of the surface can negatively affect the density of a point cloud depicting that surface. Other examples of environmental factors impacting point cloud density include the presence of bright ambient light, e.g., sunlight, which may heat the surface of the object 104 and result in artifacts when infrared-based sensing is employed.

Figure 2:
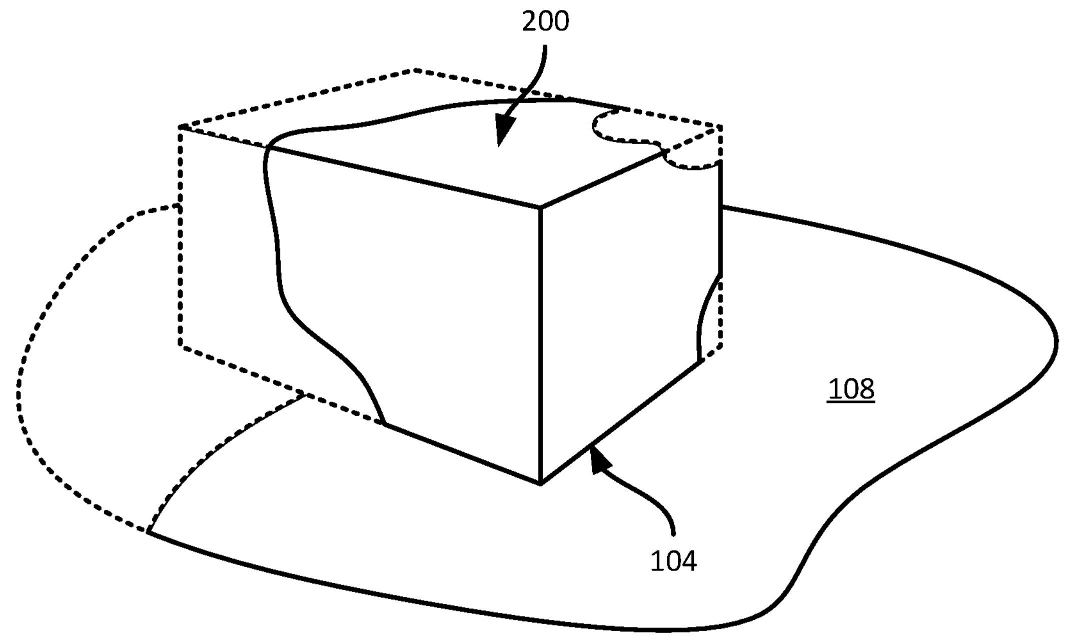
FIG. 2 is a diagram of an example point cloud captured by the device of FIG. 1.

Factors such as those mentioned above can lead to reduced point cloud density corresponding to some regions of the object 104, and/or other artifacts in a captured point cloud. Turning to FIG. 2, an example point cloud 200 is illustrated, as captured by the sensor 132. The portions of the object 104 and the support surface 108 shown in solid lines are represented in the point cloud 200, while the portions of the object 104 and the support surface 108 shown in dashed lines are not represented in the point cloud 200. That is, certain portions of the object 104 are not depicted in the point cloud 200 due to the artifacts mentioned above. The example shown in FIG. 2 is exaggerated for illustration, and it will be understood that in practice the point cloud 200 may include points in the regions illustrated as being empty, although the number and/or accuracy of those points may be suboptimal.

As will be understood from FIG. 2, it may be possible to derive the height H of the object 104 from the point cloud 200, but the width W and the depth D may not be derivable. In other examples, artifacts near the vertices of the object 104 may also impede successful dimensioning of the object 104.

The above obstacles to accurate dimensioning can impose limitations of various dimensioning applications, e.g., necessitating sensor data capture from a constrained top-down position rather than the more flexible isometric position shown in FIG. 1 (in which three faces of the object 104 are presented to the sensor 132). Further limitations can include restrictions on dimensioning larger objects, dark-colored objects, and the like.

Returning to FIG. 1, to mitigate the above obstacles to point cloud capture and downstream activities such as object dimensioning, the device 100 also stores a sensor data enhancement application 144 in the memory 120. Execution of the application 144 by the processor 116 configures the processor 116 to process data captured via the sensor 132 to enhance the captured point cloud with synthetic points (e.g., points that are generated by the processor 116 without having been observed by the sensor 132). The synthetic points can correct at least some of the above-mentioned artifacts, e.g., increasing point cloud density in regions that may otherwise have been under-sampled by the original point cloud. The enhanced point cloud can then be processed, e.g., via the application 136, to determine dimensions for the object 104. In other examples, the application 144 can be implemented within the sensor assembly 132 itself (which can include a dedicated controller or other suitable processing hardware). In further examples, either or both of the applications 136 and 144 can be implemented by one or more specially designed hardware and firmware components, such as FPGAs, ASICs and the like.

Figure 3:
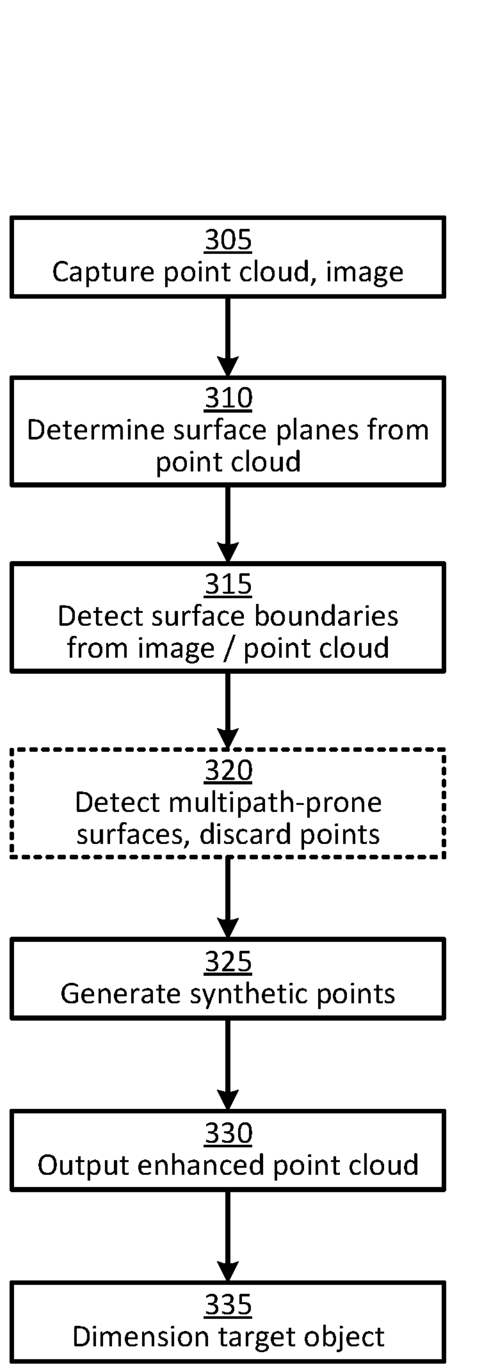
FIG. 3 is a flowchart of a method of enhanced depth sensor coverage.

Turning to FIG. 3, a method 300 of enhanced depth sensor coverage is illustrated. The method 300 is described below in conjunction with its performance by the device 100, e.g., to dimension the object 104. It will be understood from the discussion below that the method 300 can also be performed by a wide variety of other computing devices including or connected with sensor assemblies functionally similar to the sensor assembly 132.

At block 305, the device 100 is configured, e.g., via control of the sensor 132 by the processor 116, to capture a point cloud depicting a plurality of surfaces of the object 104 (e.g., the three faces visible in FIGS. 1 and 2), as well as an image depicting the same plurality of surfaces. The point cloud, as shown in FIG. 2, does not necessarily fully depict the surfaces within the FOV of the sensor 132, but rather may include discontinuities, regions with reduced point density, or the like. The image captured at block 305, as noted earlier, may have a greater resolution than the point cloud as a result of the capture of ambient light in addition to light emitted by the depth sensor. The image is captured substantially simultaneously with the point cloud, e.g., by the same sensor in the case of a ToF sensor assembly, and/or by an independent color or greyscale camera that is synchronized with the depth sensor.

Figure 4:
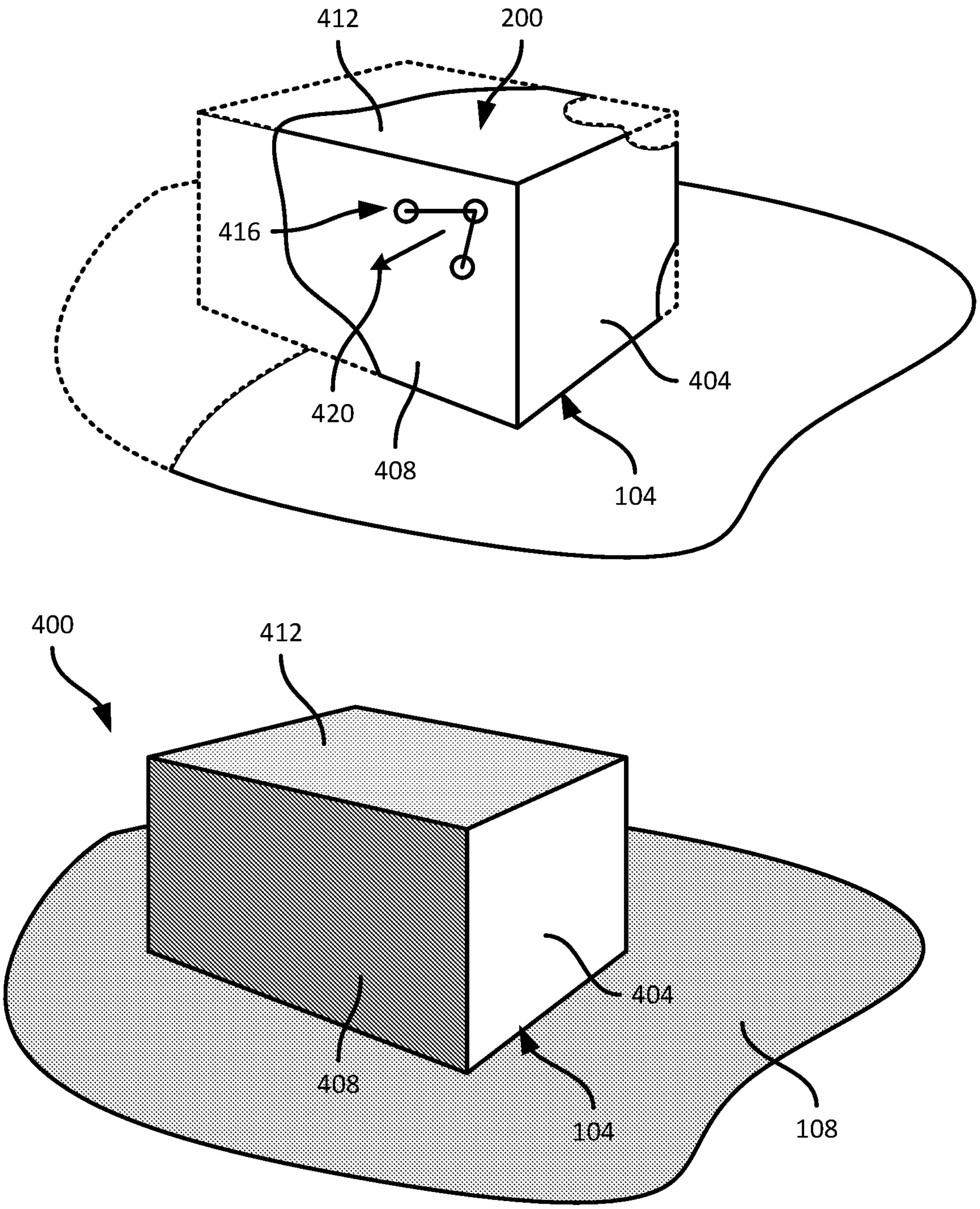
FIG. 4 is a diagram of an example performance of block 305 of the method of FIG. 3.

FIG. 4 illustrates an example point cloud 200 and an example image 400 captured at block 305. The point cloud 200 and the image 400 each depict surfaces 404, 408, and 412 of the object 104. The image 400 is, in this example, a greyscale image captured by an infrared-sensitive ToF sensor, simultaneously with the capture of the point cloud 200. The image 400 therefore includes a two-dimensional array of pixels, each including a value indicating a brightness or the like. In other examples, the image can include color data (e.g., red, green, and blue values for each pixel). As shown in FIG. 4, while the point cloud 200 provides an incomplete depiction of the visible surfaces of the object 104, the image 400 is less likely to include discontinuities or other artifacts, due to the increased light level available for image capture relative to depth capture.

Returning to FIG. 3, at block 310 the device 100 is configured to determine respective planes corresponding to each of the surfaces depicted in the point cloud from block 305. That is, the processor 116 is configured to determine a plane equation for each of the surfaces 404, 408, and 412, according to any suitable mechanism for detecting and defining planes. Returning to FIG. 4, a plane definition can be derived for the surface 408 from a minimum of three points 416 in the point cloud 200, from which a normal vector 420 can be generated. The plane equation can be expressed, for example, by a set of coefficients and a constant, e.g., in the form [ax+by +cz+d=0], as will be apparent to those skilled in the art. In some examples, the planes corresponding to each of the surfaces 404, 408, and 412 can be determined via a suitable plane-fitting algorithm, such as random sample consensus (RANSAC), or the like.

Figure 5:
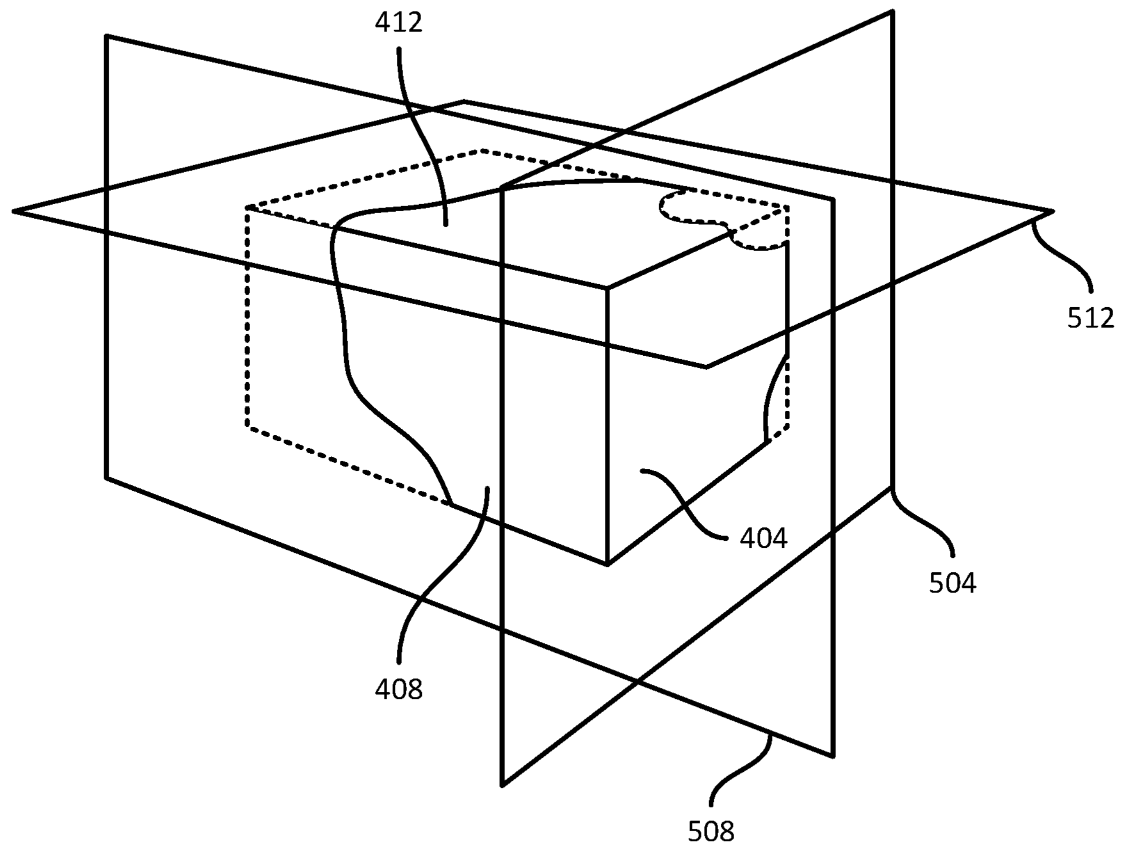
FIG. 5 is a diagram of an example performance of block 310 of the method of FIG. 3.

FIG. 5 illustrates a set of planes 504, 508, and 512 corresponding respectively to the surfaces 404, 408, and 412. The device 100 can also be configured to generate a plane for the support surface 108, but such a plane is omitted in this example for clarity of illustration. When a support surface 108 is present (e.g., if the object 104 is resting on the support surface 108 rather than held in an operator's hand, by a forklift, or the like), the device 100 can be configured to discard any substantially horizontal plane having a lower height than any other portion of the point cloud 200, to segment the object 104 from the support surface 108.

Although the planes 504, 508, and 512 are shown as having boundaries in FIG. 5, it will be apparent to those skilled in the art that the planes are mathematically unbounded. The planes determined at block 310 partially define the object 104 in three-dimensional space, but as noted in connection with FIG. 2, certain aspects of the object 104 may not be accurately defined in the point cloud 200, such as the boundaries of each surface 404, 408, and 412 (that is, the edges of the object 104). The planes 504, 508, and 512 derived from the point cloud 200 at block 310, in other words, may not define the boundaries of the surfaces 404, 408, and 412. Further, depending on the nature of the artifacts present in the point cloud 200, certain surface boundaries may not be derivable from the point cloud 200.

The device 100 is therefore configured, at block 315, to detect boundaries of the surfaces depicted in the point cloud 200 and the image 400 based on the image 400 and optionally on the planes from block 310. The image 400, as noted earlier, has a greater resolution than the point cloud 200 and is less susceptible to the artifacts mentioned above. The device 100 can therefore detect edges from the image 400, e.g., via gradient changes in the color and/or brightness values in the image data. A wide variety of edge-detection algorithms can be deployed to detect the boundaries of the surfaces 404, 408, and 412, as will be apparent to those skilled in the art (e.g., Canny edge detector, Sobel edge detector, or the like). As discussed below, the surface boundaries detected from the image 400 can then be employed along with the planes detected from the point cloud 200 to enhance the point cloud 200 for subsequent processing (such as dimensioning of the object 104).

Figure 6:
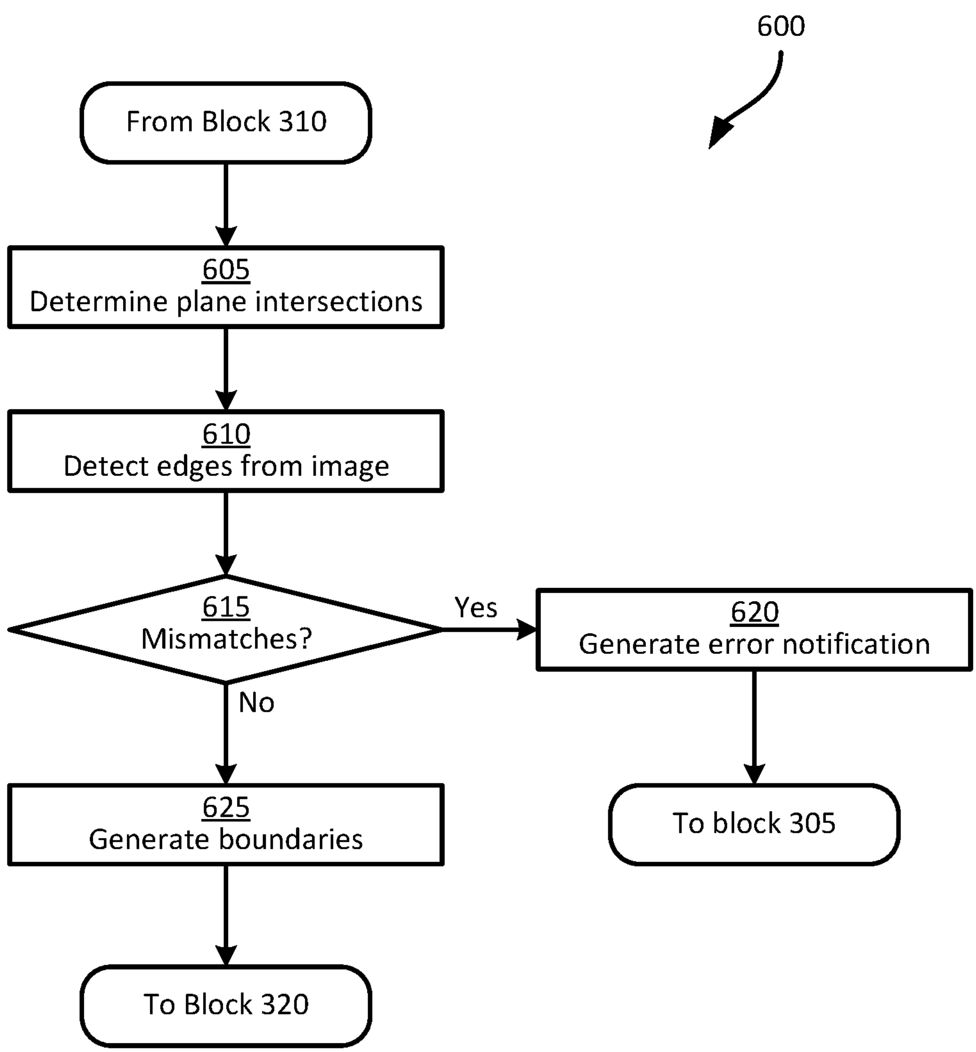
FIG. 6 is a flowchart of a method of performing block 315 of the method of FIG. 3.

In some examples, the image-detected surface boundaries can be supplemented with or compared to surface boundaries detected from the planes 504, 508, and 512, as shown in FIG. 6. FIG. 6 illustrates an example method 600 of performing block 315, in which both the point cloud 200 and the image 400 are employed for boundary detection. In particular, at block 605 the device 100 can be configured to determine the intersections of the planes from block 310. At block 610 (which can be performed simultaneously with block 605, or before block 605), the device 100 configured to detect the surface boundaries from the image 400, as discussed above.

Figure 7:
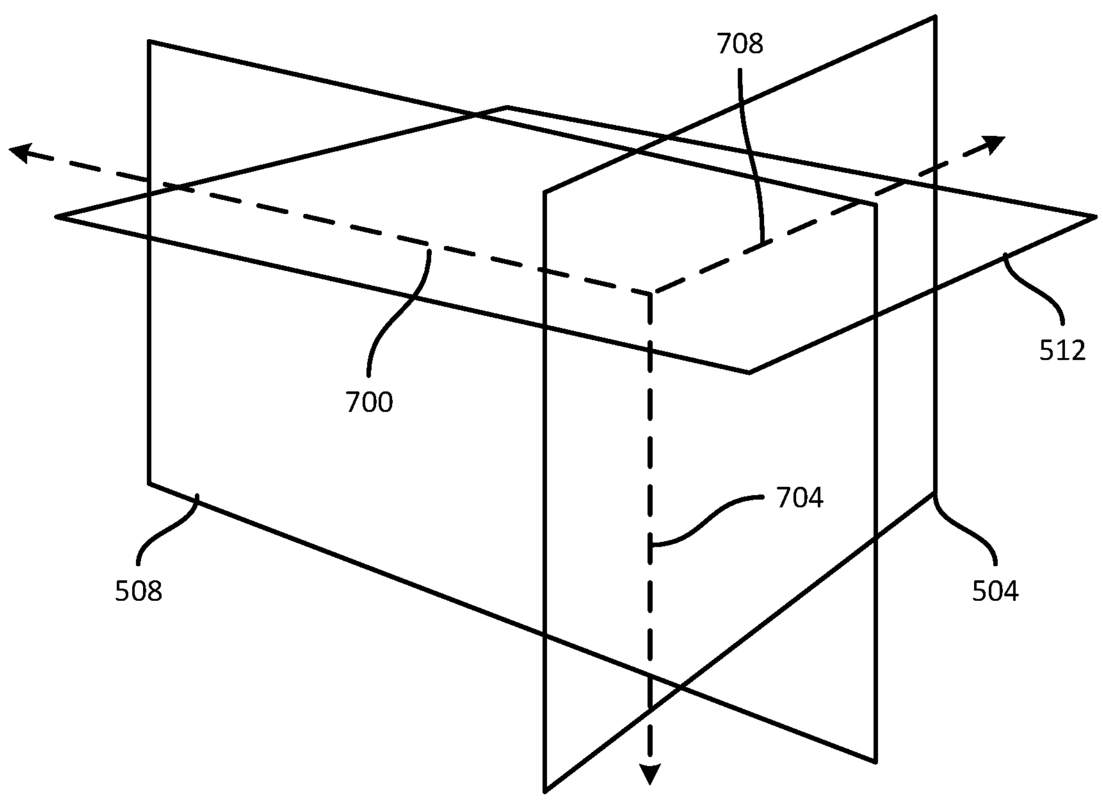
FIG. 7 is a diagram of an example performance of the method of FIG. 6.
Figure 7:
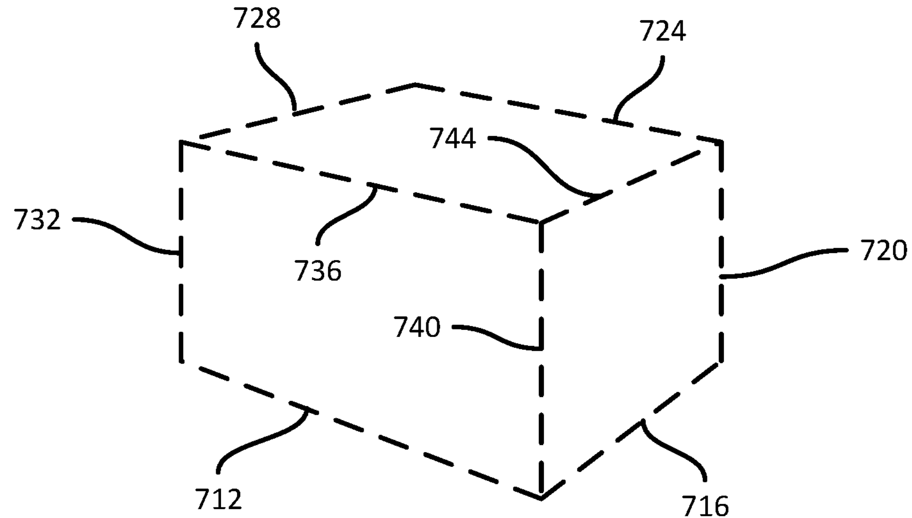

FIG. 7 illustrates the results of example performances of blocks 605 and 610. In particular, intersections 700 (of the planes 508 and 512), 704 (of the planes 504 and 508), and 708 (of the planes 504 and 512) can be determined via readily available geometric identities. In addition, the device 100 can determine, from the image 400, edges 712, 716, 720, 724, 728, 732, 736, 740, and 744. As will be evident from FIG. 7, certain ones of the edges 712, 716, 720, 724, 728, 732, 736, 740, and 744 correspond to the same boundaries as the intersections 700, 704, and 708. Other edges, however, do not correspond to intersections from block 605.

At block 615, the device 100 can be configured to determine whether the intersections from block 605 and the edges from block 610 conflict. For example, the device 100 can be configured to determine whether any of the 712, 716, 720, 724, 728, 732, 736, 740, and 744 are within a first threshold distance of any of the intersections 700, 704, and 708, but at a greater distance than second threshold (smaller than the first threshold) from the relevant intersection. An edge that is sufficiently close to an intersection to indicate that the edge likely corresponds to the same physical boundary, but further from the intersection than the second threshold, indicates that either or both of the plane detection from block 605 and the edge detection from block 610 may have been inaccurate. The device 100 can therefore proceed to block 620 and generate an error notification (e.g., on the display 128), before returning to block 305.

When the determination at block 615 is negative (e.g., when each of the intersections 700, 704, and 708 match one of the edges 712 to 744), the device 100 can proceed to block 625, and generate boundaries for the surfaces 404, 408, and 412, based on a suitable combination of the edges 712 to 744 and the intersections 700 to 708. In the present example, each boundary is a substantially rectangular area in three-dimensional space, with vertices defined by a subset of the edges 712 to 744 and, optionally, intersections 700 to 708.

In some examples, generating the boundaries can include determining the three-dimensional positions of the edges 712 to 744 (e.g., based on calibration data mapping pixel coordinates of the image 400 to the three-dimensional frame of reference used for the point cloud, as will be understood by those skilled in the art), and returning the determined three-dimensional edge positions as surface boundaries. In other examples, the boundaries can be set as three-dimensional positions of the edges 712 to 744 when no matching plane intersection exists, and as averages of the three-dimensional positions of edges and matching plane intersections otherwise (e.g., for the edge 736 and the intersection 700).

Figure 8:
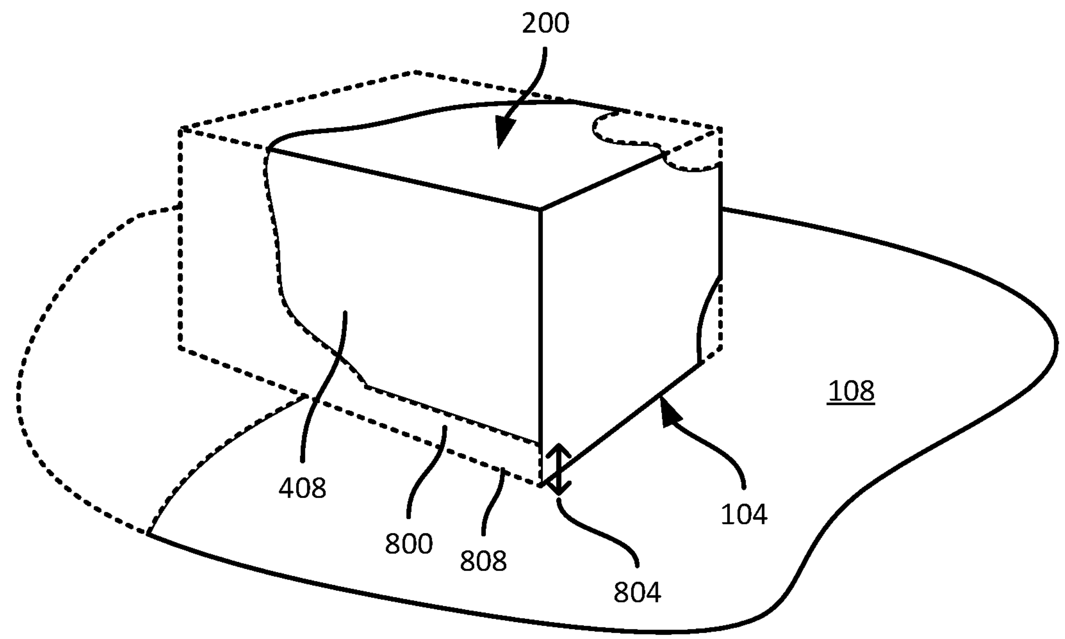
FIG. 8 is a diagram of an example performance of block 320 of the method of FIG. 3.

Referring again to FIG. 3, in response to generating the surface boundaries at block 315, the device 100 can optionally detect portions of the point cloud 200 that may be susceptible to multipath artifacts, as mentioned earlier. The device 100 can, for example, identify portions of the point cloud 200 that are within a threshold distance of a boundary between the support surface 108 and the object 104, and discard the captured points in those portions. Turning to FIG. 8, for example, the device 100 can discard the points in the region 800, which are within a threshold distance 804 of a boundary 808 (e.g., corresponding to the edge 712 shown in FIG. 7). The points in the region 800 may be susceptible to multipath artifacts due to their proximity to the support surface 108. Emitted light from the sensor 132 may, for example, reflect from the object 104 onto the support surface 108, and back to the sensor 132, artificially inflating the round trip time of the reflections and therefore inflating the perceived distance to the points in the region 800. In other examples, block 320 can be omitted.

The deletion of points at block 320 need not be performed for each boundary from block 315. Instead, the device 100 can be configured to identify a subset of the boundaries (including as few as zero boundaries) that indicate susceptibility to multipath artifacts. Those include transitions between surfaces with an angle facing the sensor 132 that is less than one hundred and eighty degrees. In some examples, the device 100 may limit the search for multipath-susceptible boundaries to those with an angle between adjacent surfaces of less than about one hundred degrees.

Returning to FIG. 3, at block 325 the device 100 is configured to generate a plurality of synthetic points for insertion into the point cloud. Each synthetic point has a three-dimensional position on one of the planes from block 310, and on that plane, lies within the corresponding boundary. In other words, the device 100 is configured to generate a plurality of synthetic points corresponding to each of the surfaces 404, 408, and 412 of the object 104.

Figure 9:
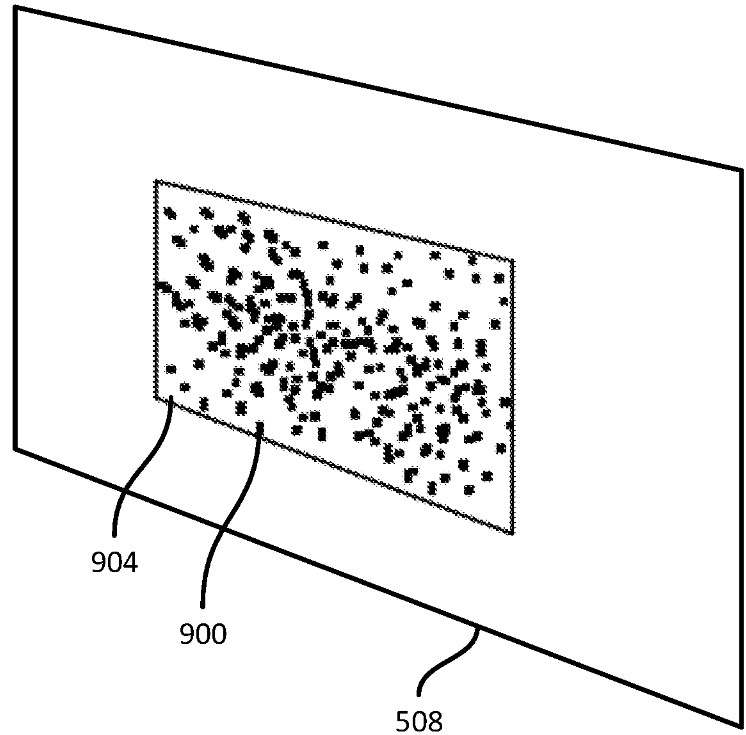
FIG. 9 is a diagram of an example performance of block 325 of the method of FIG. 3.

The generation of synthetic points for a given plane is therefore based on the equation of that plane, and on the three-dimensional position of the boundary from block 315 that lies on the plane. For example, the device 100 can be configured to select (e.g., based on a uniform random distribution function or any other suitable function) a plurality of coordinate pairs (e.g., x and y, x and y, or y and z), and determine the remaining coordinate using the plane's equation. The number of synthetic points generated at block 320 can be predetermined to produce a sufficiently dense point cloud for dimensioning of the object 104. FIG. 9 illustrates an example performance of block 325 for the surface 408 of the object 104, in which a plurality of synthetic points 900 are generated on the plane 508 and within a boundary 904 generated from the edges 712, 732, 736, and 740. The same process can be repeated for each of the surfaces 408 and 412.

Figure 10:
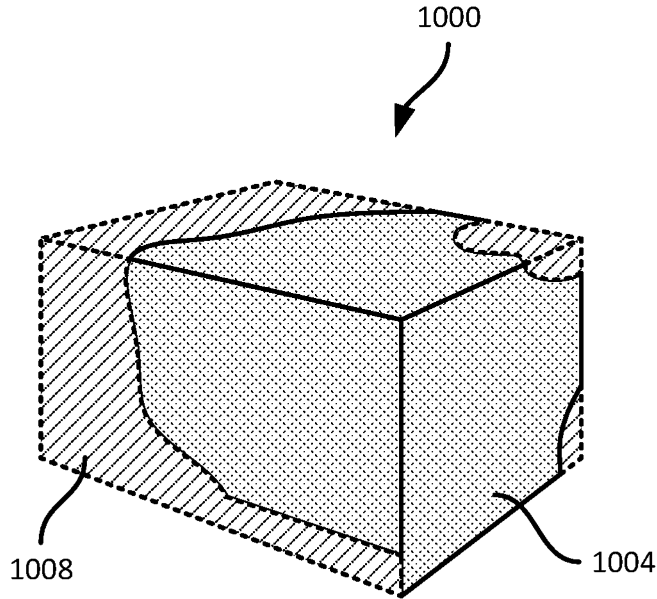
FIG. 10 is a diagram of an example performance of block 330 of the method of FIG. 3.

At block 330, the device 100 is configured to insert the synthetically generated points into the point cloud 200 to produce an enhanced point cloud, and return the enhanced point cloud for further processing, e.g., by the application 144. For example, as shown in FIG. 10, an enhanced point cloud 1000 can be generated and output at block 330. The enhanced point cloud 1000 includes portions 1004 where the point cloud 200 included sufficient data for dimensioning (or other suitable downstream processing actions), and has been supplemented with synthetic points, as well as portions 1008 where the point cloud 200 lacked sufficient data for dimensioning. Insertion of the synthetic points 900, however, enables use of the enhanced point cloud 1000 for dimensioning or other actions. At block 335, therefore, the device 100 can also be configured to generate dimensions of the object 104, such as the width W, depth D, and height H, according to any suitable dimensioning algorithm (e.g., detecting vertices of the object 104 from the point cloud 1000 and determine the distances between those vertices).

As will be understood from the discussion above, enhancement of the point cloud 200 with synthetic points can effectively enhance the observed coverage area by the sensor 132, and facilitate the use of point clouds for dimensioning and other functions under conditions that may not otherwise have permitted such functions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a computing device, the method comprising:

obtaining (i) a point cloud having captured points depicting a plurality of surfaces of a target object, and (ii) an image depicting the plurality of surfaces of the target object;

determining, from the point cloud, respective planes corresponding to each of the plurality of surfaces;

determining respective boundaries of each of the plurality of surfaces, including determining intersections of the planes corresponding to each of the plurality of surfaces based on the point cloud, determining respective edges corresponding to each of the plurality of surfaces based on the image, and determining whether each of the intersections and the respective edges are within a threshold distance;

for each of the plurality of surfaces, generating synthetic points, at least some of the synthetic points having positions different from positions of the captured points in the point cloud, the positions of the synthetic points disposed on a corresponding plane of the target object and within a corresponding surface boundary; and providing an enhanced point cloud including (i) at least a portion of the captured points, and (ii) the synthetic points.

2. The method of claim 1, wherein capturing the point cloud and the image includes controlling a time-of-flight sensor to capture the point cloud and the image.

3. The method of claim 2, wherein the image has a greater resolution than the point cloud.

4. The method of claim 1, wherein detecting the boundaries of each surface includes:

detecting a first subset of the boundaries from the image; and determining respective positions of the first subset from the point cloud.

5. The method of claim 4, wherein detecting the boundaries of each surface includes: determining positions of a second subset of the boundaries based on intersections between the planes corresponding to the surfaces.

6. The method of claim 4, wherein the first subset of the boundaries include boundaries at which the planes do not intersect.

7. The method of claim 1, further comprising: generating dimensions for the target object based on the enhanced point cloud.

8. The method of claim 1, wherein generating the synthetic points includes generating the synthetic points according to a random distribution.

9. The method of claim 1, further comprising:

selecting a portion of the captured point cloud adjacent to a transition between distinct surfaces; and discarding the portion of the captured point cloud.

10. The method of claim 9, wherein the portion of the captured point cloud is within a threshold distance of the transition.

11. A computing device comprising:

a processor configured to:

obtain (i) a point cloud having captured points depicting a plurality of surfaces of a target object, and (ii) an image depicting the plurality of surfaces of the target object; and determine, from the point cloud, respective planes corresponding to each of the plurality of surfaces;

determine respective boundaries of each of the plurality of surfaces, including determining intersections of the planes corresponding to each of the plurality of surfaces based on the point cloud, determining respective edges corresponding to each of the plurality of surfaces based on the image, and determining whether each of the intersections and the respective edges are within a threshold distance;

for each of the plurality of surfaces, generate synthetic points, at least some of the synthetic points having positions different from positions of the captured points in the point cloud, the positions of the synthetic points disposed on a corresponding plane of the target object and within a corresponding surface boundary; and provide an enhanced point cloud including (i) at least a portion of the captured points, and (ii) the synthetic points.

12. The computing device of claim 11, wherein the computing device further comprises:

a sensor configured to capture the point cloud and the image.

13. The computing device of claim 12, wherein the image has a greater resolution than the point cloud.

14. The computing device of claim 11, wherein the processor is configured to detect the boundaries of each surface by:

detecting a first subset of the boundaries from the image; and determining respective positions of the first subset from the point cloud.

15. The computing device of claim 14, wherein the processor is configured to detect the boundaries of each surface by:

determining positions of a second subset of the boundaries based on intersections between the planes corresponding to the surfaces.

16. The computing device of claim 14, wherein the first subset of the boundaries include boundaries at which the planes do not intersect.

17. The computing device of claim 11, wherein the processor is further configured to:

generate dimensions for the target object based on the enhanced point cloud.

18. The computing device of claim 11, wherein the processor is configured to generate the synthetic points by generating the synthetic points according to a random distribution.

19. The computing device of claim 11, wherein the processor is further configured to: select a portion of the captured point cloud adjacent to a transition between distinct surfaces; and discard the portion of the captured point cloud.

20. The computing device of claim 19, wherein the portion of the captured point cloud is within a threshold distance of the transition.

* * * * *